Aug. 7, 1951 P. WORMSER 2,563,443
FRUIT ORIENTING DEVICE
Filed June 10, 1949 2 Sheets-Sheet 1

INVENTOR.
PAUL WORMSER
BY
Herbert E. Metcalf
ATTORNEY

Aug. 7, 1951 — P. WORMSER — 2,563,443
FRUIT ORIENTING DEVICE
Filed June 10, 1949 — 2 Sheets-Sheet 2
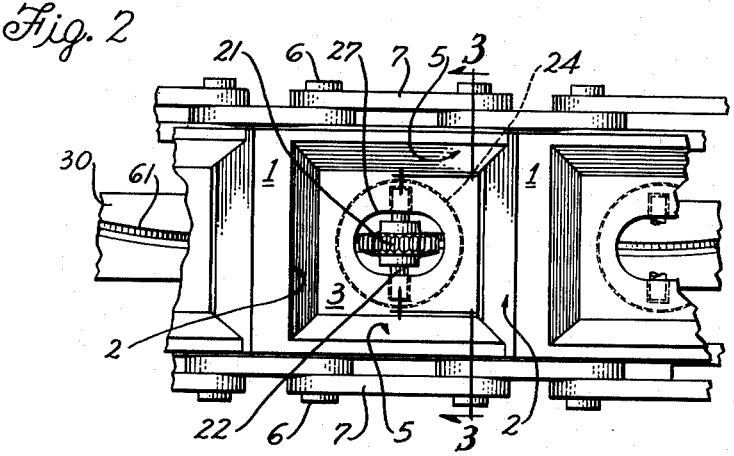
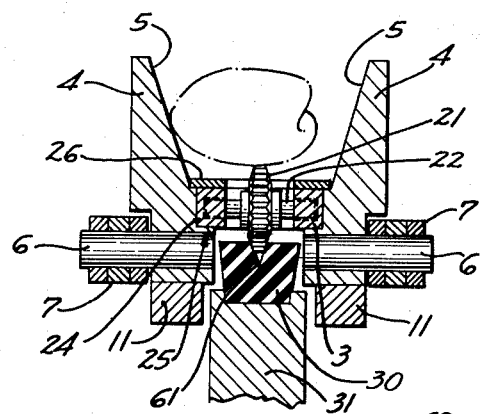
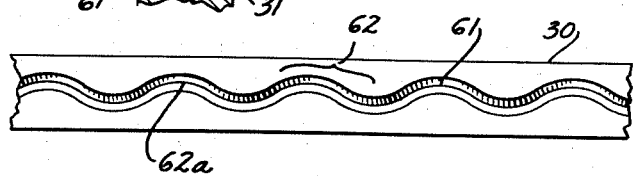
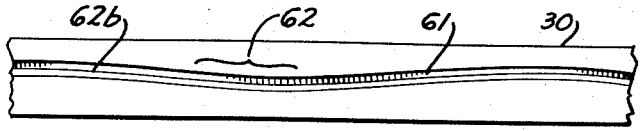
INVENTOR.
PAUL WORMSER
BY
ATTORNEY Patented Aug. 7, 1951

2,563,443

UNITED STATES PATENT OFFICE 2,563,443

FRUIT ORIENTING DEVICE

Paul Wormser, San Francisco, Calif., assignor to S & W Fine Foods, Inc., San Francisco, Calif., a corporation of California Application June 10, 1949, Serial No. 98,259

22 Claims. (Cl. 198—33)

My invention relates to fruit orientation devices and, more particularly, to a device utilizing a wheel type of fruit orientator such as that described and claimed by Carroll in United States Patent No. 2,220,511, issued November 5, 1946.

In that patent, indented fruit such as cherries are brought to an orientation device comprising a receptacle having a rotating wheel projecting upwardly from the bottom thereof to drive and rotate an indented fruit until the stem indent registered with the wheel, whereupon the fruit rotation would cease due to the reduction of frictional contact between the fruit and the wheel. This placed the fruit in an advantageous position for pitting, for example, the pit being forced out through the stem indent area with a minimum tearing and loss of fruit flesh, giving a fine and uniform appearance to the output of the machine.

While a high percentage of fruit orientation with respect to the stem indent can be obtained with a single stage of orientation, it was found that fruit such as cherries elongated along the indent-tip axis would occasionally find a rather stable rotation on the wheel when rotating with the indent-tip axis in a generally horizontal plane. Carroll obtained orientation of this type of rotating fruit by transferring the fruit to a second stage wherein the wheel was positioned at a right angle to that in the first stage, so that the cherry previously rotating with its long axis at a right angle to the plane of the wheel would, when deposited in the second stage, have a high probability of registering the indent with the wheel in ¼ or ¾ of a fruit revolution.

Carroll's device, however, was not designed to have the wheel receptacles progressed, either intermittently or continuously, as by a carrier. If this is done, the cherry or other fruit being orientated will have to have its entire orientation cycle performed in the same receptacle. An object of the present invention is to provide a means for changing the plane of rotation of the wheel and, consequently, the plane of rotation of the fruit during the passage of a fruit restraining device over a path, either continuously or intermittently, as may be found desirable. After the change in wheel plane is made, the fruit is forced to rotate on a new axis, thereby disturbing the stable condition, if attained, with the indent-tip axis horizontal. This change in rotational plane leads to a higher probability of orientation of elongated fruit.

In the co-pending application Serial No. 104,124, filed July 11, 1949, of Doering, et al., an orientation machine is shown, described and claimed wherein a plurality of orientation wheels are progressed over a path for the orientation of cherries and wherein the wheels are frictionally driven by contact with a moving belt. It is another object of the present invention to provide such an orientation device operating to change the plane of the wheel rotation while the wheel is being rotated by frictional contact, for example, with a belt.

Briefly, the present invention involves the use of a fruit restraining recess having a wheel rotated in a vertical plane at the bottom thereof. Means, such as a belt are provided, contacting the wheel so that when the belt is moved, the wheel is rotated to orientate a fruit in the recess. By mounting the wheel so that the vertical plane of rotation of this wheel can be changed, and fitting the periphery of the wheel into a groove in the belt, I am able to change the plane of wheel rotation cyclically by changing the position of the groove on the belt as the belt is progressed. I prefer to form the groove in sine wave form on the belt. While the invention is effective in orientating elongated fruit in hemispherical or cup-shaped receptacles, such as used by Carroll, the action of the wheel, when cyclically changing in vertical planes of rotation, is still more effective in orientating elongated fruit when utilized with the fruit recesses of the truncated inverted pyramidal shape preferred by Doering et al., as the throw of the fruit against surfaces of different shape when the plane of rotation of the wheel is changed away from a plane normal to one of the recess sides. The invention is also suitable for use with a carrier type orientator, as a number of wheels may be simultaneously rotated and changed in rotational plane by contact with a single grooved belt.

My invention may be more fully understood by reference to the drawing showing the present invention as applied to a carrier of the general type shown, described and claimed in the co-pending Doering, et al., application cited above.

In the drawings:

Figure 2 is a top plan view taken as indicated by arrow 2 in Figure 1.

Figure 3 is a sectional view taken as indicated by the line 3—3 in Figure 2.

Figures 4 and 5 are top plan views of grooved wheel driving belts.

Figure 1:
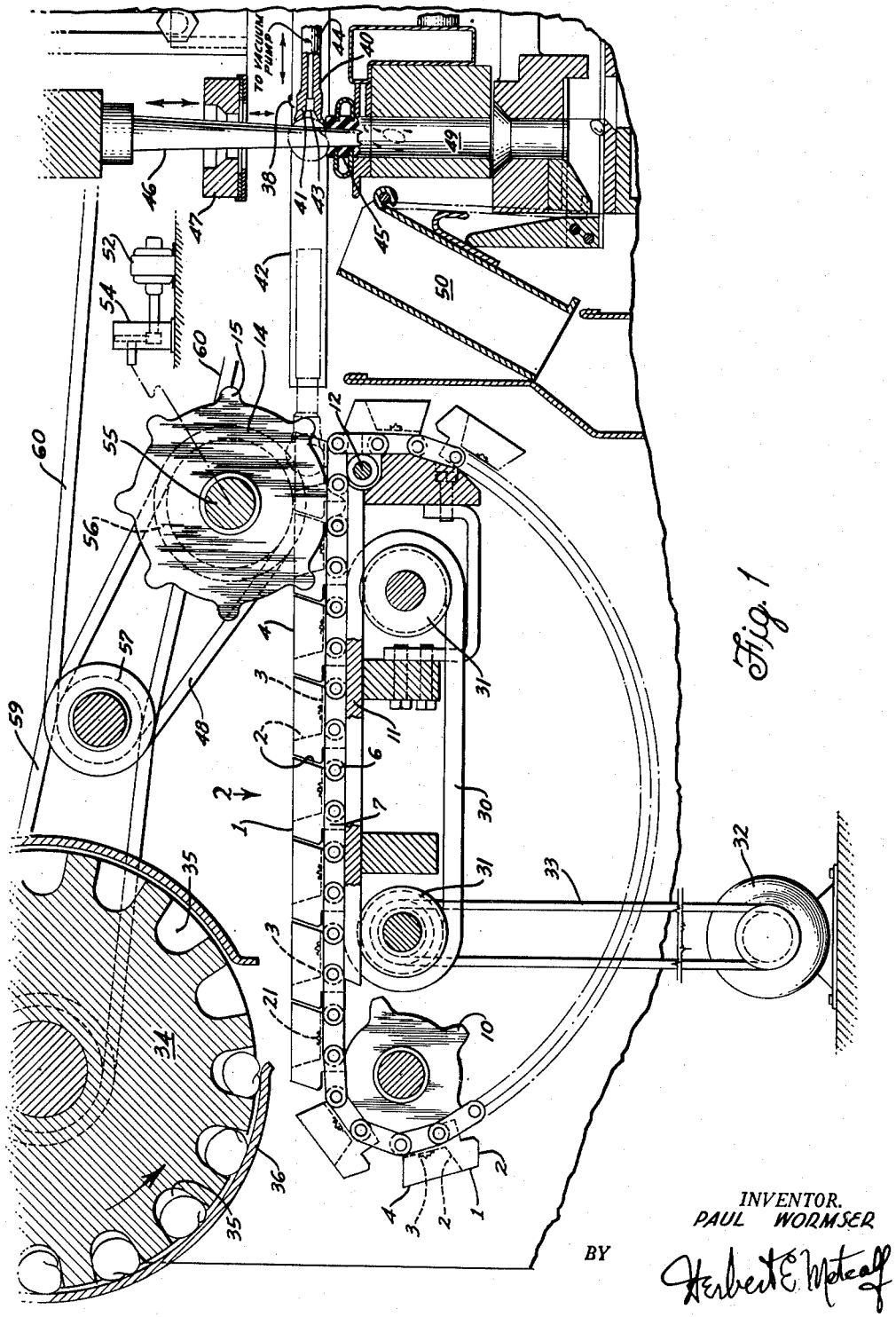
Figure 1 is a diagrammatic vertical sectional view of an orientation carrier embodying one preferred form of the present invention.

Referring first to Figure 1, a carrier is formed of a plurality of spaced cross bars 1 having front and rear inclined faces 2. Each cross bar 1 has, projected forwardly therefrom, a recess bottom 3, and spaced recess sides 4, the sides having inner side faces 5 also inclined as were faces 2, as best shown in Figures 2 and 3. Each fruit restraining recess is composed of the forward face 2 of one bar 1, the opposite faces 5 of the sides 4 attached to the bar, the attached bottom 3, and the rear face 2 of a preceding bar. The bars 1 are held in cooperative position to form such recesses by being attached by front and rear pins 6 to a pair of side chains 7, these chains being endless, to form a carrier.

This carrier passes around an idler sprocket 10 at the input end, then passes over horizontal sills 11 (Figure 3) with chains 7 sliding on these sills 11 to provide a horizontal path for the composite recesses during the carrier progression.

At the output end of this horizontal path the carrier passes over a small diameter roller 12 (Figure 1). Just above the roller 12 is positioned a drive gear 14 having teeth 15 engaging one of the chains 7, thus progressing the carrier when gear 14 is rotated.

Orientation is accomplished in this carrier by a Carroll type wheel 21 mounted and rotating freely on an axle 22 in each recess bottom 3, projecting above and below the horizontal surfaces of this bottom member, as best shown in Figure 3. Axle 22 is not attached directly in bottom 3, but is attached to a disc 24 mounted horizontally and resting on a shoulder 25 in bottom 3, the disc 24 being held against the bottom 3 by an upper bottom plate 26. Both plate 26 and disc 24 have an opening 27 therein sized to permit some lateral travel of the wheel 21 on axle 22, and disc 24 is free to rotate on bottom 3.

After the bars 1 and attached members 3 and 4 have been mounted as described on the carrier chains, a series of composite fruit restraining recesses are formed when the bars 1 and attached members 3 and 4 are on the horizontal path of the carrier, with an orientation wheel 21 at the bottom of each recess. The four sides 2 and 5 of each recess slope toward the bottom 3, forming recesses of inverted, truncated pyramidal shape. Normally, the wheels 21 are placed with their vertical planes of rotation parallel to and lying in the central line of progression of the carrier, so that when the wheels 21 are rotating fruit in the recesses, the fruit will be thrown straight forward or straight aft against a sloping side 2 of one of the cross bars 1.

The wheel driving member is a belt 30 positioned below the recesses and contacting the lower periphery of a wheel 21 in each bottom 3 when the bottoms 3 are on the horizontal path of the carrier. When relative movement is caused to take place between the recesses and belt 30, the wheel in each recess will be revolved by friction, and any fruit placed in the recess will revolve, except when the stem indent registers with the indent, when fruit rotation will cease even though the wheel rotation continues, as fully pointed out in the above cited Carroll patent.

The belt is driven through belt mounting pulleys 31 in any convenient manner, as by a belt motor 32 through connection belt 33, preferably in a direction throwing the fruit against the rear bar surface 2 in each recess when the fruit is being rotated by a wheel 21. Referring again to Figure 1, fruit is loaded at one end of the horizontal path as by a loading drum 34 provided with peripheral pockets 35 therein, filled on top with fruit from a hopper (not shown), the fruit being held in the pockets 35 by a slide 36 terminating over a recess formed when two rising bars 1 reach the horizontal path at the beginning thereof. After passage over the horizontal path, during which time the fruit is orientated by wheels 21, the fruit may be removed from the recesses after orientation by a vacuum transfer device 38 which is no part of the present invention, being shown, described and claimed in a second co-pending Doering et al. application, Serial No. 105,858, filed July 11, 1949. This transfer device will next be briefly described.

As the carrier chains 7 break over roller 12, the leading bar 1 and attached members 3 and 4 pass around the roller 12 to open the front of the recess between the bars so that a fruit therein resting on bottom 3 can be easily removed horizontally along the line of carrier progression. This condition is shown in Figure 1.

A transfer member 40 is provided having a vertical surface 41 facing the opened recess, this transfer member being reciprocated by conventional means in a slide 42 to a point where it will closely approach or touch the side of a fruit in the open recess on the carrier. Surface 41 has an aperture 43 therein positioned to contact the equator of the average fruit, and as transfer member 40 approaches the fruit, suction is applied to the aperture through flexible tube 44 so that the fruit in the recess sticks to the surface 41 and is transported to the other end of travel of transfer member 40. Here the fruit is positioned over a pitting rubber 45 of conventional design and is pitted by a pitting knife 46 moving downwardly through a stripper plate 47 to push the cherry pit through the stem indent and rubber aperture 48 into a pit chute 49, as is customary in mechanical cherry pitters.

As the transfer member 40 starts back for the next cherry, the cherry just pitted is pushed over a discharge chute 50 with suction removed, or with positive suction (pressure) substituted, so that the fruit can fall freely off the surface 41 into the discharge chute 50. The next cherry is then picked from the next opened recess and the cycle is repeated.

The power drive for the machine is, for example, from a main motor 52 through a reducing gear 54 to a gear shaft 55 on which gear 14 is mounted. Gear pulley 56 drives idler pulleys 57 through idler belt 48. Drum 34 and the transfer device 38 are driven from idler pulleys 57 as by belts 59 and 60, respectively.

During orientation of the fruit on the horizontal path of the carrier, the wheel rotational plane is changed by providing wheel belt 30 with a groove 61 into which the lower periphery of the wheel projects, as shown in Figure 3, the edges of the groove 61 forming guides determining the angular positioning of the wheel rotational plane, which, if the groove were straight would be parallel to the line of belt progression. Change of the wheel plane is obtained by changing the direction of the groove with respect to the line of belt progression, such as by varying the position of the groove on the belt in a cyclic manner. One form of groove may be that of a sine wave groove 62, as shown in Figures 4 and 5, or the groove can be shaped to move the wheel plane in a non-regular manner, if desired. In Figure 4 the groove 62 has a short period wave form 62a, whereas in Figure 5 groove 62 has a long period wave form 62b. In any case, the wheel is free to follow the groove angularly and laterally because disc 24 can turn as the angular position of the wheel is changed and the wheel 21 can slide slightly sideways on axle 22 to accommodate the shift due to the amplitude of the groove divergence from the center line of the belt and recess.

It has been found that wheel plane shifts up to 30° can be obtained. It has also been found that when cyclic shifts are made, the cherries do not tend to maintain the undesirable stable position as shown in Figure 3, even if elongated. It has further been found that the slight lateral shift of wheel position in the recess does not disturb properly orientated fruit, as the shift takes place within the raised indent area under these conditions.

It is to be noted that the rotation plane angle assumed by the wheel 21 in the recess is determined, not by the amplitude of the groove departure from the center line, but by the number of groove wave cycles in a unit length of belt, assuming the belt is being progressed at a constant speed. Thus, for the same groove amplitude, a slow change in angle can be made with a small angular divergence, or a rapid and large change in angle can be made. In a similar manner the wheel can be made to operate centrally for a relatively long period with a sudden angular shift made cyclically to disturb any fruit assuming the position shown in Figure 3.

One of the important features of the present invention is that when the rotational plane of the wheel is changed, with respect to the recess described herein as having an inverted truncated pyramidal shape, the cherry, as it is being rotated by the wheel, is normally thrown against the rear flat wall 2 of the composite recess and touches this wall while rotating substantially at the rear of the wheel. However, when the angle of wheel rotation is changed, the fruit is thrown into a corner of the recess, thereby tending to turn the fruit and further upset the former stable position as the fruit is being thrown against walls having a new angular relation to the fruit.

Thus, the present invention is ideally adapted for use in conjunction with such a recess, although by no means is the present invention to be restricted for use with this inverted truncated pyramidal recess, as distinct orientation advantages will be obtained when used with orientation recesses of other shapes as well and when used with the customary cup-shaped or hemispherical receptacles.

Thus, by an exceptionally simple invention I have been able to significantly increase orientation of elongated fruit, either by preventing any substantial number of fruit from assuming a relatively stable position on an orientation wheel with the indent tip axis horizontal or, by disturbing such a position after it has been assumed.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form (of several modes of) putting the invention into effect, and the invention is, therefore, claimed in any of its forms or modifications within the legitimate and valid scope of the appended claims.

I claim:

1. In a machine for orientating indented fruit, means defining a fruit restraining recess, a wheel positioned in the bottom of said recess and projecting into said recess to contact a fruit therein, said wheel being mounted to rotate in a vertical plane, a wheel driving member positioned below said wheel and contacting the lower periphery of said wheel, means for moving said driving member relative to said recess to rotate said wheel, said wheel driving member having a wheel guiding surface thereon bearing on said wheel and shaped to change the vertical plane of rotation thereof.

2. In a machine for orientating indented fruit, means defining a fruit restraining recess, a wheel positioned in the bottom of said recess and projecting into said recess to contact a fruit therein, said wheel being mounted to rotate in a vertical plane, a wheel driving member positioned below said wheel and contacting the lower periphery of said wheel, means for moving said driving member relative to said recess to rotate said wheel, said wheel driving member having a wheel guiding surface thereon bearing on said wheel and shaped to cyclically change the vertical plane of rotation thereof.

3. Apparatus in accordance with claim 1 wherein said wheel driving member is an endless belt having an upper surface contacting said wheel, and wherein said guide means is a groove in said upper surface.

4. Apparatus in accordance with claim 1 wherein said wheel driving member is an endless belt having an upper surface contacting said wheel, wherein said guide means is a groove in said upper surface, and wherein said groove angularly departs from the direction of movement of said belt.

5. Apparatus in accordance with claim 1 wherein said wheel driving member is an endless belt having an upper surface contacting said wheel, wherein said guide means is a groove in said upper surface, and wherein said groove angularly and cyclically departs from the direction of movement of said belt.

6. In a machine for orientating indented fruit, a carrier, means for progressing said carrier over a path, means defining a plurality of fruit restraining recesses mounted on said carrier, a wheel mounted for rotation in a vertical plane in the bottom of each of said recesses, a wheel driving member contacting the lower periphery of a plurality of wheels as said recesses are progressed over said path, said member being mounted for relative movement with respect to said recesses so that said wheels will be rotated by said contact, said wheel driving member having a wheel guiding surface thereon bearing on said wheels and shaped to change the planes of rotation thereof as said recesses are progressed.

7. In a machine for orientating indented fruit, a carrier, means for progressing said carrier over a path, means defining a plurality of fruit restraining recesses mounted on said carrier, a wheel mounted for rotation in a vertical plane in the bottom of each of said recesses, a wheel driving member contacting the lower periphery of a plurality of wheels as said recesses are progressed over said path, said member being mounted for relative movement with respect to said recesses so that said wheels will be rotated by said contact, said wheel driving member having a wheel guiding surface thereon bearing on said wheels and shaped to cyclically change the planes of rotation thereof as said recesses are progressed.

8. Apparatus in accordance with claim 6 wherein said wheel driving means is an endless belt having an upper surface contacting said wheels, and wherein said wheel guiding surface is a groove in said upper surface.

9. Apparatus in accordance with claim 6 wherein said wheel driving means is an endless belt having an upper surface contacting said wheels, wherein said wheel guiding surface is a groove in said upper surface, and wherein said groove angularly and cylically departs from the direction of movement of said recesses.

10. Apparatus in accordance with claim 6 wherein said wheel driving means is an endless belt having an upper surface contacting said wheels, wherein said wheel guiding surface is a groove in said upper surface, and wherein said groove describes a sine wave curve on said belt.

11. In a machine for orientating indented fruit, a carrier, means for progressing said carrier over a substantially horizontal path, means defining a plurality of fruit restraining recesses mounted on said carrier, a pivot mounted for rotation in a horizontal plane in the bottom of each of said recesses, a wheel mounted on each pivot and having a portion thereof extending into the recess and a portion extending below said recess, an endless belt mounted below a plurality of recesses while on said horizontal path and having a surface positioned to contact a plurality of said wheels, guide means on said belt surface bearing against said wheels to determine the position of said pivot in the horizontal plane, and means for driving said belt to rotate said wheels.

12. In a machine for orientating indented fruit, a carrier, means for progressing said carrier over a substantially horizontal path, means defining a plurality of fruit restraining recesses mounted on said carrier, a pivot mounted for rotation in a horizontal plane in the bottom of each of said recesses, a wheel mounted on each pivot and having a portion thereof extending into the recess and a portion extending below said recess, an endless belt mounted below a plurality of recesses while on said horizontal path and having a surface positioned to contact a plurality of said wheels, a groove on said belt surface fitting the lower periphery of said wheels and holding said pivots in predetermined positions in the horizontal plane, and means for driving said belt to rotate said wheels.

13. In a machine for orientating indented fruit, a carrier, means for progressing said carrier over a substantially horizontal path, means defining a plurality of fruit restraining recesses mounted on said carrier, a pivot mounted for rotation in a horizontal plane in the bottom of each of said recesses, a wheel mounted on each pivot and having a portion thereof extending into the recess and a portion extending below said recess, an endless belt mounted below a plurality of receptacles while on said path and having a surface positioned to contact a plurality of said wheels, a groove on said surface fitting the lower periphery of said wheels and holding said pivots in predetermined positions in the horizontal plane, and means for driving said belt to rotate said wheels, said groove having portions angularly departing from the line of progression of said recesses to rotate said pivot over an arc while said wheels are rotated.

14. In a machine for orientating indented fruit, a carrier, means for progressing said carrier over a substantially horizontal path, means defining a plurality of fruit restraining recesses mounted on said carrier, a pivot mounted for rotation in a horizontal plane in the bottom of each of said recesses, a wheel mounted on each pivot and having a portion thereof extending into the recess and a portion extending below said recess, an endless belt mounted below a plurality of recesses while on said path and having a surface positioned to contact a plurality of said wheels, a groove on said surface fitting the lower periphery of said wheels and holding said pivots in predetermined positions in the horizontal plane, and means for driving said belt to rotate said wheels, said groove having a substantially sine wave curvature to cyclically rotate said pivot over an arc while said wheels are rotated.

15. In a machine for orientating indented fruit, means defining a carrier, means for progressing said carrier over a path, means defining a plurality of fruit restraining recesses mounted on said carrier, each of said recesses having a bottom, a wheel mounted on said bottom for rotation in a plurality of vertical planes, and single means for simultaneously rotating said wheel and changing the vertical plane of rotation thereof.

16. In a machine for orientating indented fruit, means defining a carrier, means for progressing said carrier over a path, means defining a plurality of fruit restraining recesses having a bottom, a wheel mounted on said bottom for rotation in a plurality of vertical planes, and a single driving member bearing against a portion of said wheel and shaped to simultaneously rotate said wheel and change the vertical plane of rotation thereof.

17. In a machine for orientating indented fruit, means defining fruit restraining recesses mounted on said carrier, each of said recesses having a bottom and substantially flat sides forming a recess of truncated pyramidal shape, and single means for rotating a fruit in a vertical plane in said recess and for simultaneously changing the vertical plane of rotation.

18. In a machine for orientating indented fruit, means defining a fruit restraining recess having a bottom and substantially flat sides forming a recess of rectangular truncated pyramidal shape, means for rotating a fruit in said recess in a vertical plane substantially normal to two of said flat sides, and means for changing the relation of said vertical plane to the planes of said last mentioned sides.

19. In a machine for orientating indented fruit, means defining a carrier, means for progressing said carrier over a path, means defining a plurality of fruit restraining recesses mounted on said carrier, each of said recesses having a bottom and substantially flat sides forming a recess of truncated pyramidal shape, a wheel centrally mounted in the bottom of said receptacle for rotation in a vertical plane and for rotation on a vertical axis, and single means for rotating said wheel in a vertical plane and for rotating said wheel on said vertical axis.

20. In a machine for orientating indented fruit, means defining a fruit restraining recess having a bottom and substantially flat sides forming a fruit recess of truncated pyramidal shape, a wheel mounted on said bottom for rotation in a plurality of vertical planes, and wheel driving and positioning means for rotating said wheel in a plurality of vertical planes.

21. In a machine for orientating indented fruit, means defining a fruit restraining recess having a bottom and substantially flat sides forming a recess of truncated pyramidal shape, a wheel mounted on said bottom for rotation in a plurality of vertical planes, and wheel driving and positioning means for rotating said wheel in a plurality of vertical planes, said planes including a plane normal to the plane of at least one of said flat sides.

22. In a machine for orientating indented fruit, means defining a fruit restraining recess having a bottom and substantially flat sides forming a recess of truncated pyramidal shape, a wheel mounted on said bottom for rotation in a plurality of vertical planes, and wheel driving and positioning means for rotating said wheel in a plurality of vertical planes, said planes including a plane normal to the plane of at least one of said flat sides together with additional planes at other angular relations to the plane of said last mentioned flat side.

PAUL WORMSER.

REFERENCES CITED

The following references are of record in the file of this patent:

UNITED STATES PATENTS

| Number | Name | Date |
| --- | --- | --- |
| 1,711,051 | Gates | Apr. 30, 1929 |
| 2,106,997 | Fenner | Feb. 1, 1938 |
| 2,159,318 | Carter | May 23, 1939 |
| 2,265,515 | Carroll | Dec. 9, 1941 |
| 2,387,709 | Ashlock | Oct. 30, 1945 |